UNITED STATES PATENT OFFICE.

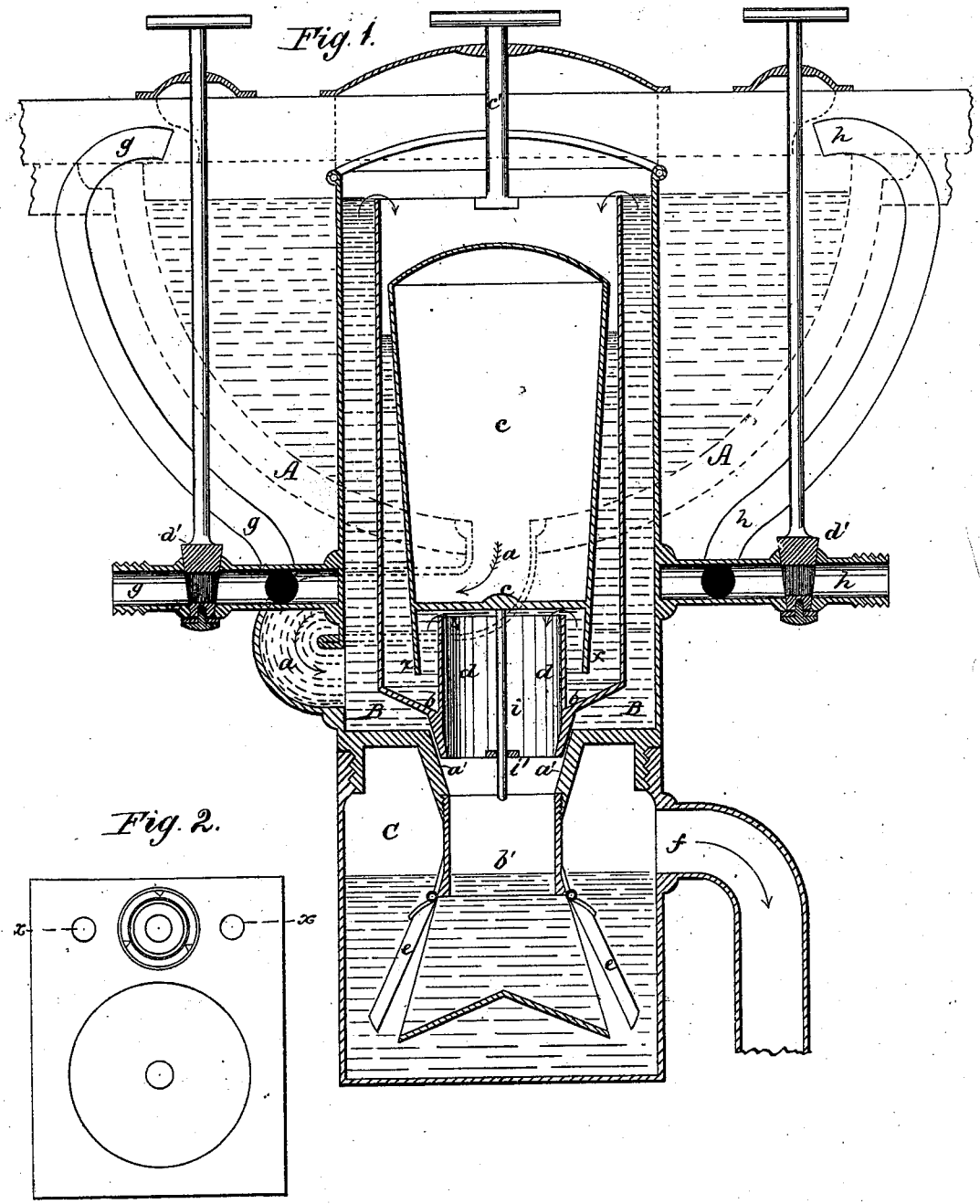

DAVID HEALY, OF LOS ANGELES, CALIFORNIA, ASSIGNOR OF ONE-HALF HIS RIGHT TO BENJN. F. COULTER, CHARLES F. HARPER, AND ROBT. S. MOORE, OF SAME PLACE.

IMPROVEMENT IN WASTE-TRAPS.

Specification forming part of Letters Patent No. 204,037, dated May 21, 1878; application filed April 10, 1878.

*To all whom it may concern:*

Be it known that I, DAVID HEALY, of the city and county of Los Angeles, and State of California, have invented a new and Improved Waste-Trap; and I do hereby declare that the following is a full, clear, and exact description of the same.

The object of my invention is to so construct a supply and waste overflow and trap as to prevent the escape of sewer-gas, to attain an absolute prevention against siphonage, and to supply hot and cold water to a basin through concealed pipes; and it consists in a trap constructed with two water-seals, arranged with respect to each other, and a float-valve, which, when subjected to suction, will adhere more closely to its seat, and hence prevent the removal of water from the trap.

In the accompanying drawing, forming part of this specification, Figure 1 is a transverse section in line $x\ x$ of Fig. 2. Fig. 2 is a top view or plan.

In the drawing, A A represent the bowl of a wash-stand, from which the water is conveyed by a waste-pipe, $a\ a$, into the cylinder or reservoir B, and from thence into the cylindrical valve or plunger $b$, where it is temporarily arrested by the float-valve $c$. This cylinder B is mounted upon and communicates with another chamber or trap, C, and is provided with a valve-seat, $a'$, extending down and into said chamber C, from which depends a funnel, $b'$, provided with gravitating-valves $e\ e$.

When the cylindrical plunger or valve $b$ is seated in the base of cylinder B, the water rises around the latter to its open top, at which point it flows into said latter plunger $b$ and around the float-valve $c$.

When the water has attained a proper height in the plunger its buoyancy raises the float-valve $c\ c$ from its seat on the tube $d\ d$, allowing the water to pass into the funnel $b'$, leading into the lower chamber C, and through hinged or gravitating valves $e\ e$.

When the water in the lower chamber or trap C attains the level of overflow-pipe $f$ it passes off through said pipe into the sewer.

In order to discharge the contents of the basin A, the cylindrical plunger $b$ is raised from its seat by rod or handle $c'$, when the water immediately passes into chamber C, and from thence through the lateral or overflow pipe $f$. While the water has thus been discharged from the basin, yet a perfect water-seal is maintained by the combination of the plunger $b$ and float-valve $c$.

In order that the depending flange $x$ of the float-valve $c\ c$ may maintain a concentric relationship with respect to the tube $d\ d$, the valve $c\ c$ is provided with a stem, $i$, which passes through a guide-bar, $i'$, connected to the lower part of said tube $d$.

It is obvious that the several parts of my trap may be cast or formed of light sheet metal, and that chamber C and funnel $b'$ may be united to cylinder B in a detachable manner.

The pipes $g\ g$ and $h\ h$ are respectively for hot and cold water, and are provided with suitable stop-cocks $d'\ d'$.

In connecting my trap with a basin, it may be located on either side of the latter; but I find it preferable, however, to place it at the rear.

It is not only applicable to basins, but also to bath-tubs, kitchen-sinks, water-closets, and similar devices requiring a water-trap and seal.

What I claim as new is—

1. The cylinder B, in combination with plunger $b$ and float-valves $c\ c$, constructed substantially as shown and described.

2. The combination of a basin or other water-receptacle with cylinder B, plunger $b$, and float-valve $c\ c$, for the purpose set forth.

3. The combination of cylinder B, having seat $a'$, plunger $b$, with tapering base, funnel $b'$, provided with gravitating-valves $e\ e$, and trap or chamber C, substantially as and for the purpose set forth.

4. The detachable plunger $b$, constructed with tapering base, tube $d\ d$, cross-bar $i'$, and float-valve $c\ c$, substantially as set forth.

DAVID HEALY.

Witnesses:
S. H. BUCHANAN,
W. HERBERT.